United States Patent
Hamachi

(10) Patent No.: US 10,165,609 B2
(45) Date of Patent: Dec. 25, 2018

(54) COMMUNICATION APPARATUS, METHOD FOR CONTROLLING COMMUNICATION APPARATUS, AND PROGRAM

(71) Applicant: CANON KABUSHIKI KAISHA, Tokyo (JP)

(72) Inventor: Toshifumi Hamachi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 173 days.

(21) Appl. No.: 14/768,426

(22) PCT Filed: Feb. 14, 2014

(86) PCT No.: PCT/JP2014/000766
§ 371 (c)(1),
(2) Date: Aug. 17, 2015

(87) PCT Pub. No.: WO2014/129154
PCT Pub. Date: Aug. 28, 2014

(65) Prior Publication Data
US 2015/0382391 A1   Dec. 31, 2015

(30) Foreign Application Priority Data

Feb. 20, 2013 (JP) ................................ 2013-030900
Feb. 20, 2013 (JP) ................................ 2013-030901

(51) Int. Cl.
*H04W 76/14* (2018.01)
*H04W 4/80* (2018.01)
(Continued)

(52) U.S. Cl.
CPC ............ *H04W 76/14* (2018.02); *H04W 4/80* (2018.02); *H04W 8/005* (2013.01); *H04W 84/12* (2013.01)

(58) Field of Classification Search
None
See application file for complete search history.

(56) References Cited

U.S. PATENT DOCUMENTS

2009/0239469 A1* 9/2009 Rangarajan ............. H04L 67/16
455/41.2
2009/0303926 A1* 12/2009 Den Hartog ........ H04L 12/2809
370/328

(Continued)

FOREIGN PATENT DOCUMENTS

JP    2011-517884 A    6/2011
JP    2012-175351 A    9/2012

(Continued)

OTHER PUBLICATIONS

Wi-Fi Alliance Member Symposium, China, Apr. 1, 2011 Retrieved from the Internet: URL:http://www.wi-fi.org files/20110421_China_Symposia_full_merge.pdf [retrieved on Dec. 3, 2012], pp. 1-326.

*Primary Examiner* — Faruk Hamza
*Assistant Examiner* — Cassandra L Decker
(74) *Attorney, Agent, or Firm* — Canon USA, Inc., IP Division

(57) ABSTRACT

A communication apparatus includes a first detection unit configured to detect a service executable by another communication apparatus based on a communication in a first communication layer before the communication apparatus constructs a network with the another communication apparatus. The communication apparatus further includes a second detection unit configured to detect a service executable by the another communication apparatus based on a communication in a second communication layer that is different from the first communication layer after the communication apparatus has been wirelessly connected to the another communication apparatus, if a detection result obtained by the first detection unit does not indicate that the another communication apparatus is capable of executing a predetermined service.

14 Claims, 12 Drawing Sheets

(51) Int. Cl.
   *H04W 8/00*    (2009.01)
   *H04W 84/12*   (2009.01)

(56) References Cited

U.S. PATENT DOCUMENTS

| | | | |
|---|---|---|---|
| 2010/0232408 A1* | 9/2010 | Lim | H04W 76/023 370/338 |
| 2010/0322213 A1* | 12/2010 | Liu | H04L 67/16 370/338 |
| 2011/0216753 A1* | 9/2011 | Kneckt | H04L 45/70 370/338 |
| 2012/0076118 A1* | 3/2012 | Montemurro | H04W 48/16 370/338 |
| 2012/0243524 A1 | 9/2012 | Verma | |
| 2013/0067068 A1* | 3/2013 | Hassan | H04W 76/02 709/224 |
| 2013/0148642 A1* | 6/2013 | Abraham | H04W 8/005 370/338 |
| 2013/0346553 A1* | 12/2013 | Shin | H04W 76/043 709/217 |
| 2014/0045422 A1* | 2/2014 | Qi | H04W 76/023 455/39 |

FOREIGN PATENT DOCUMENTS

| | | |
|---|---|---|
| JP | 2012-522461 A | 9/2012 |
| JP | 2013-511236 A | 3/2013 |

* cited by examiner

[Fig. 1]
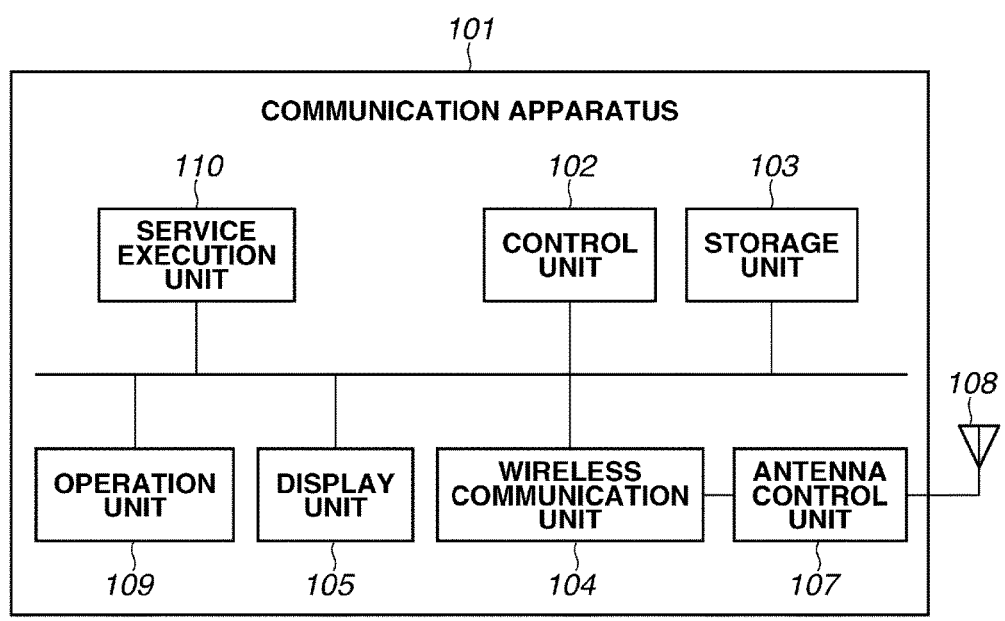

[Fig. 2]
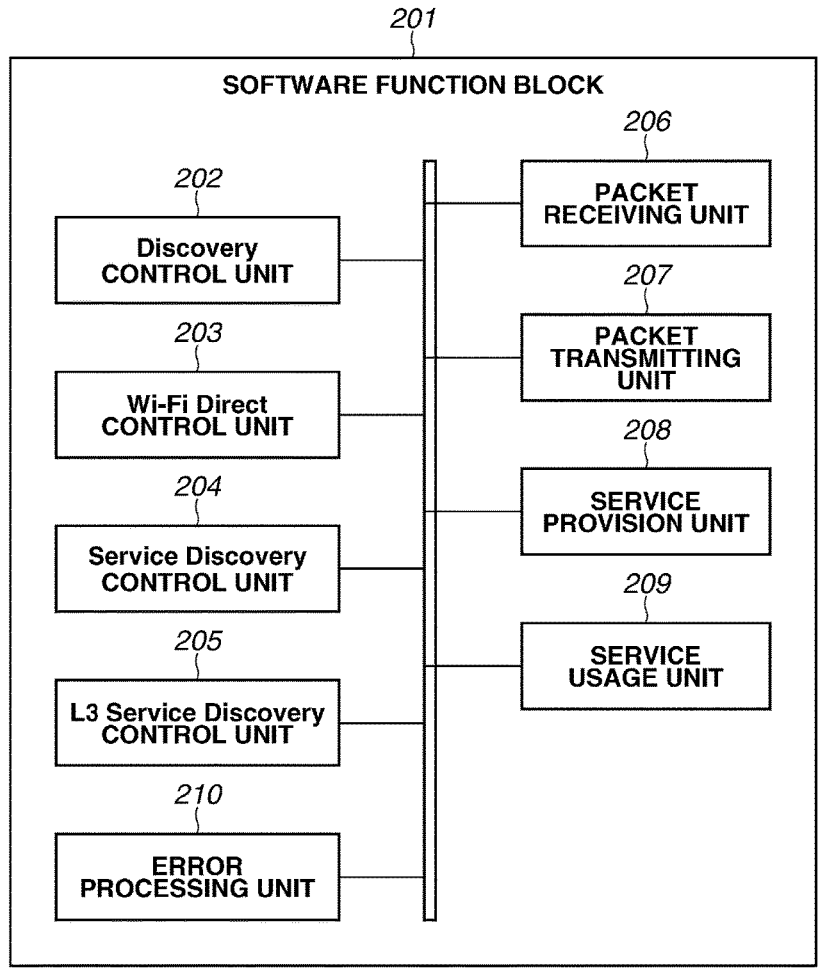
[Fig. 3]
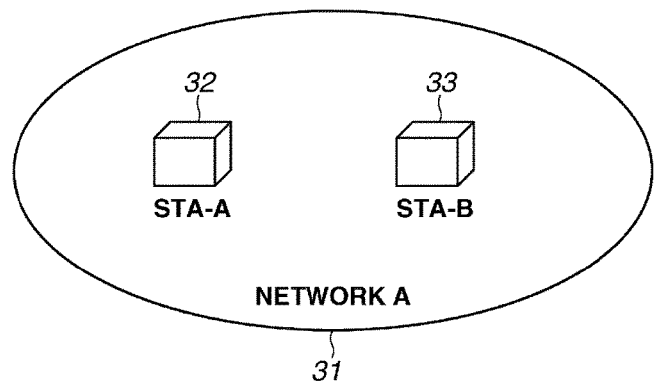

[Fig. 4]
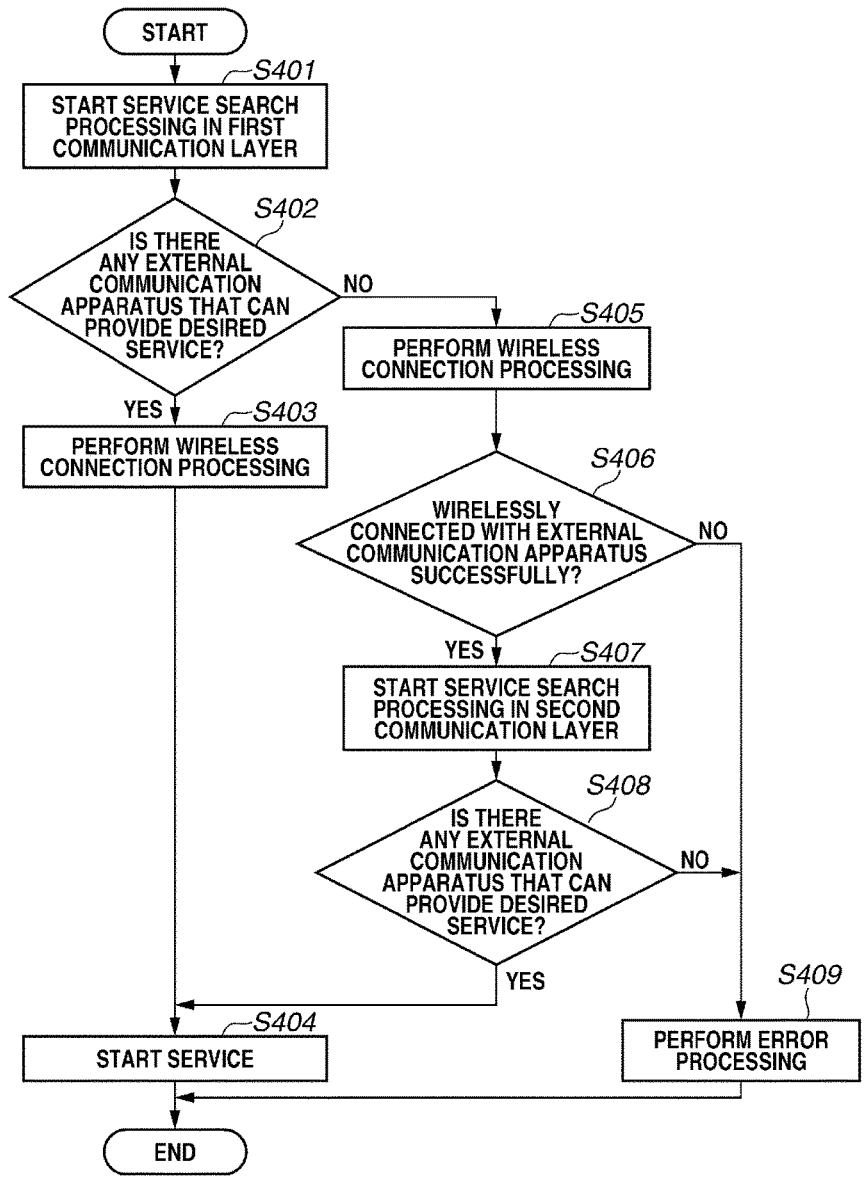

[Fig. 5]
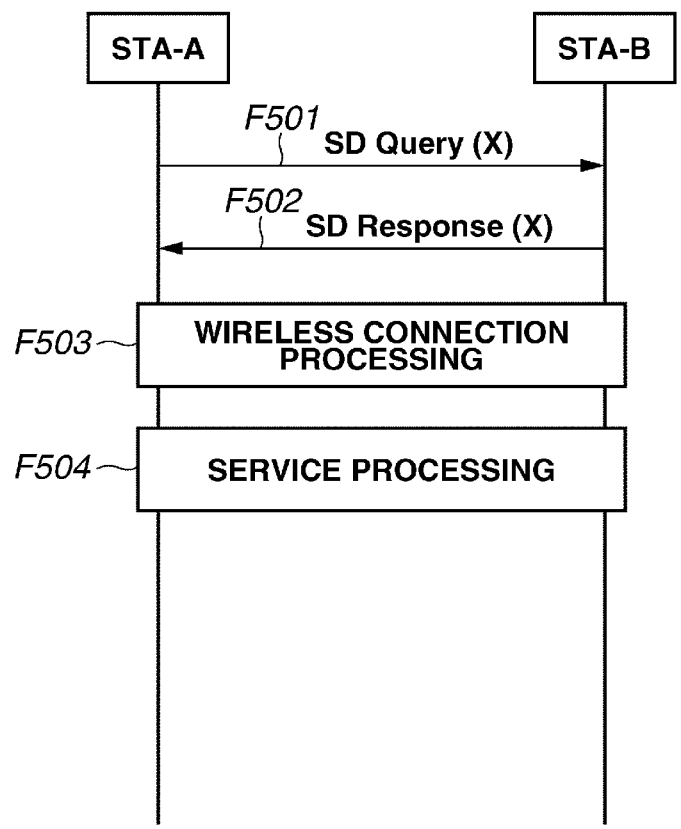

[Fig. 6]
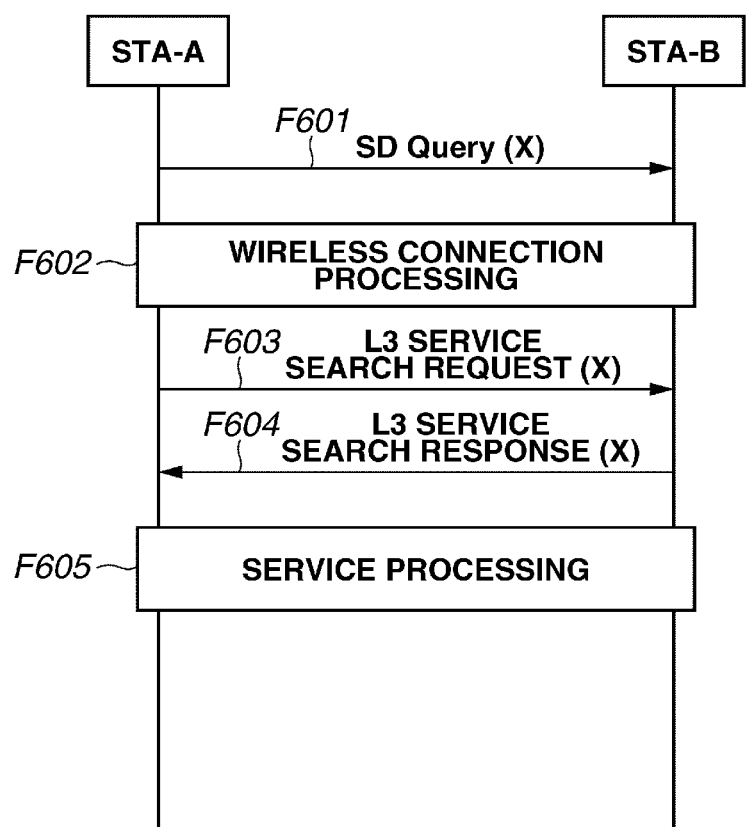

[Fig. 7]
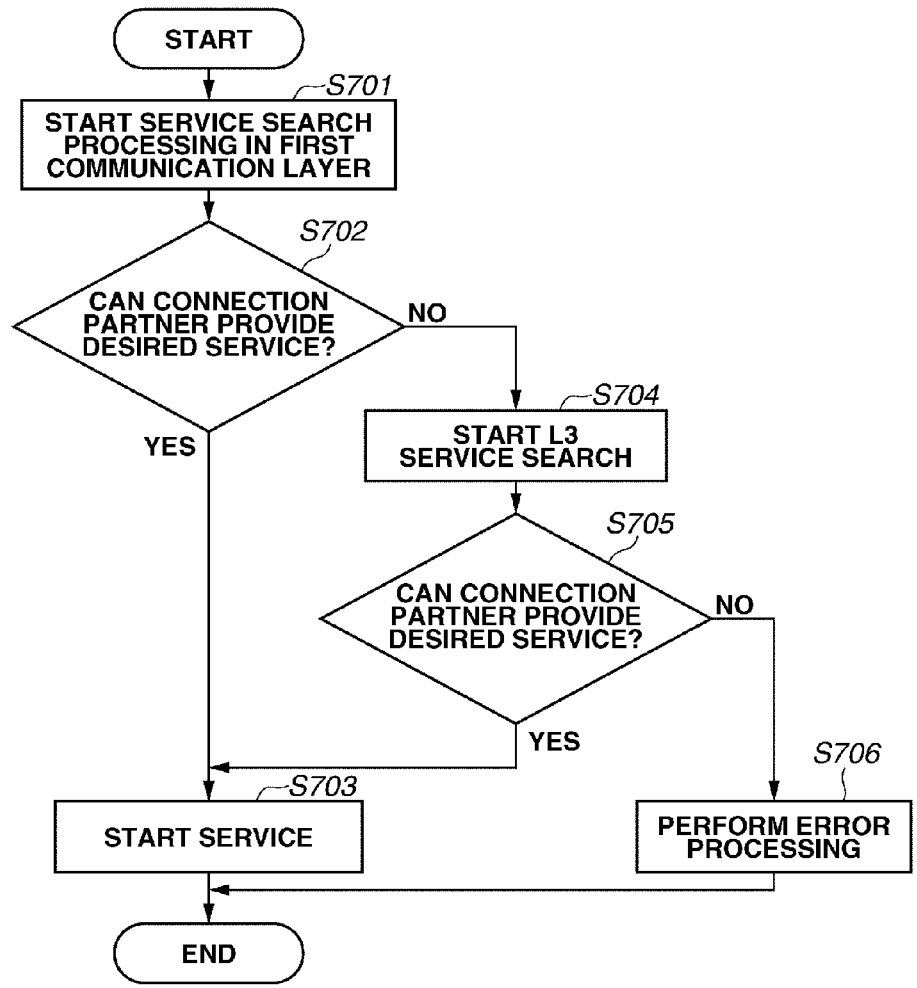

[Fig. 8]
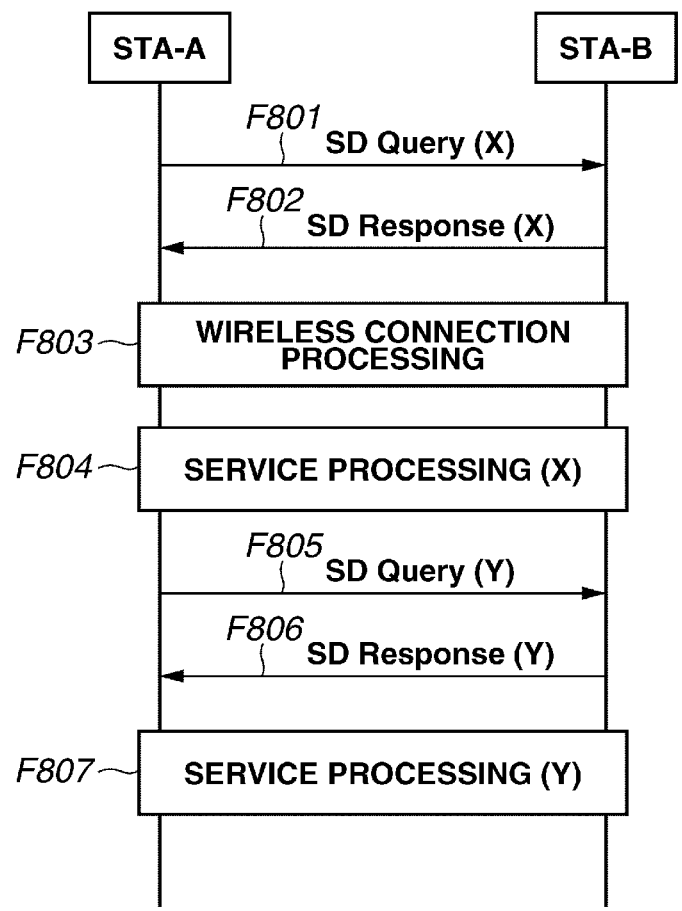

[Fig. 9]
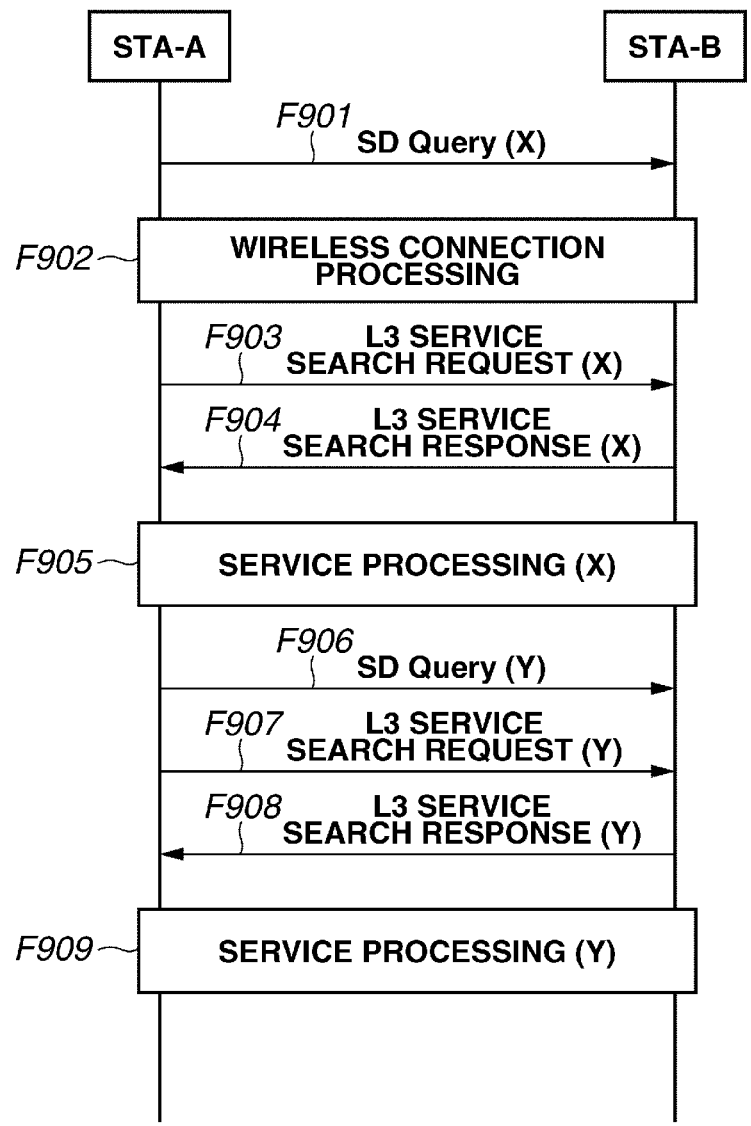

[Fig. 10]
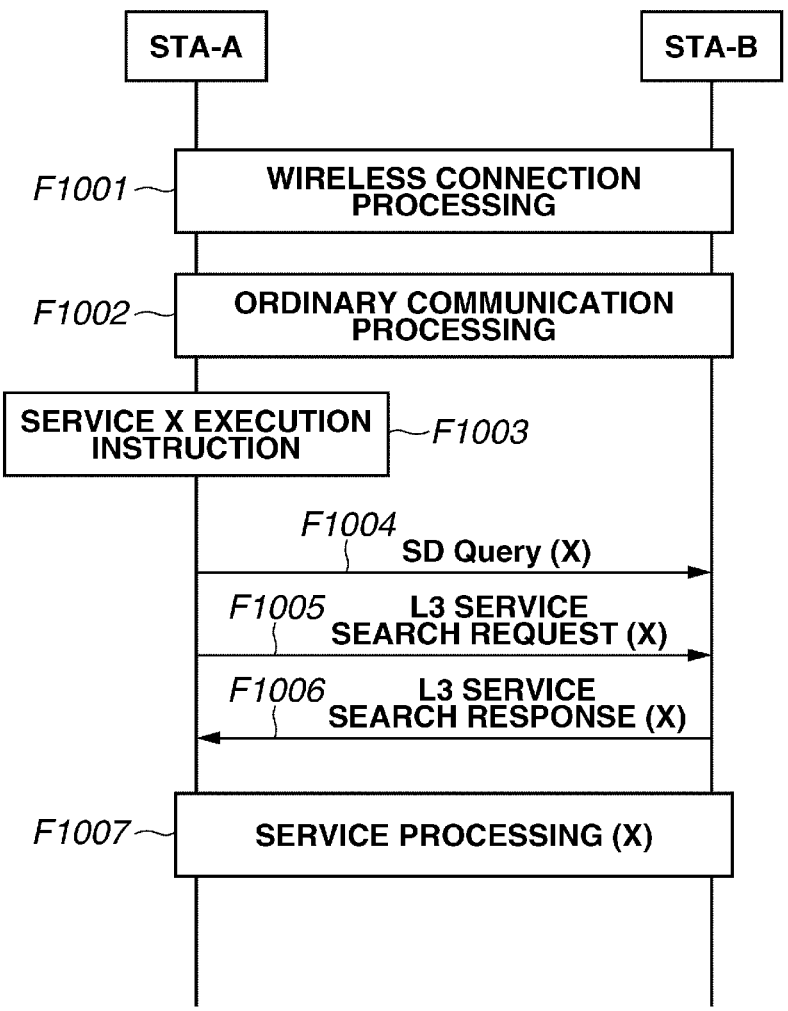

[Fig. 11]
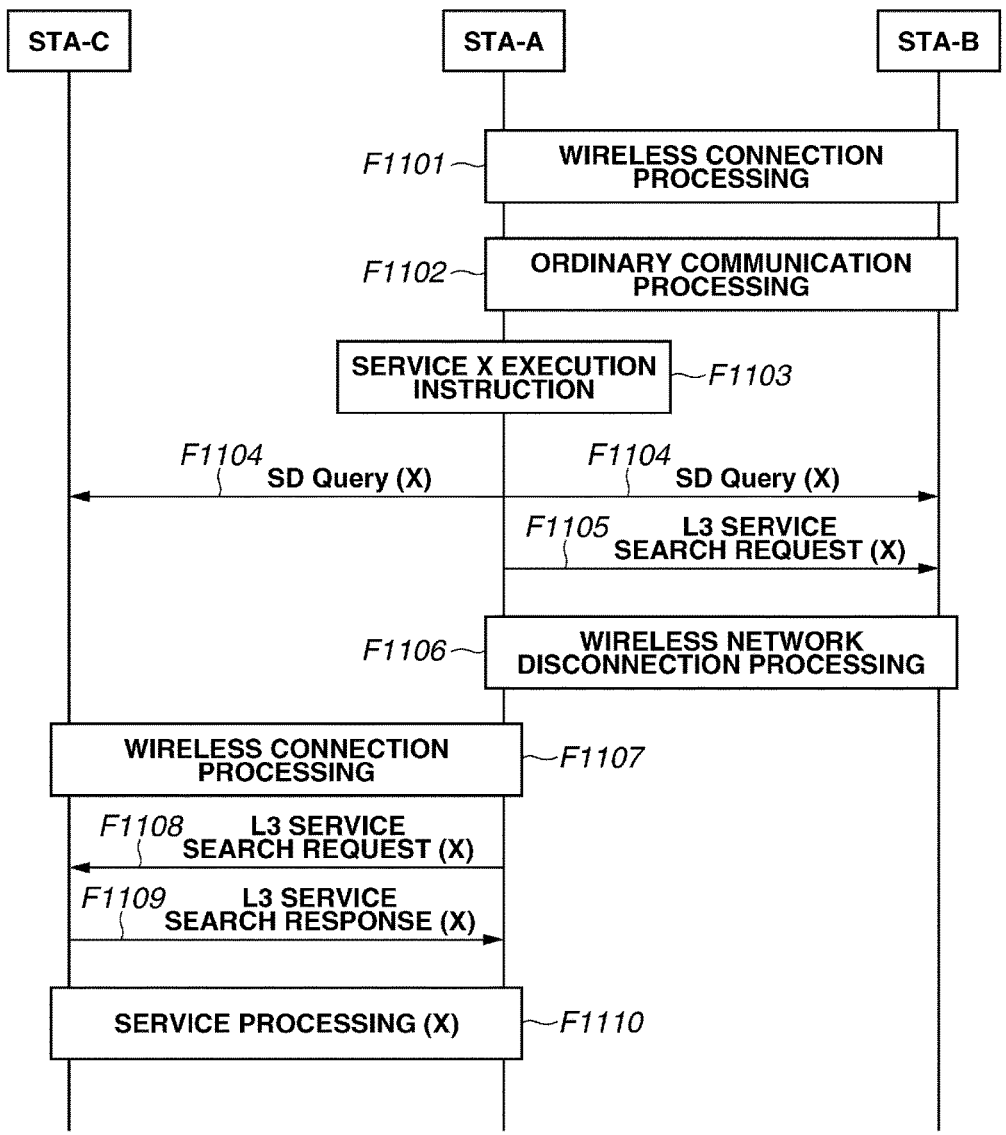

[Fig. 12A]
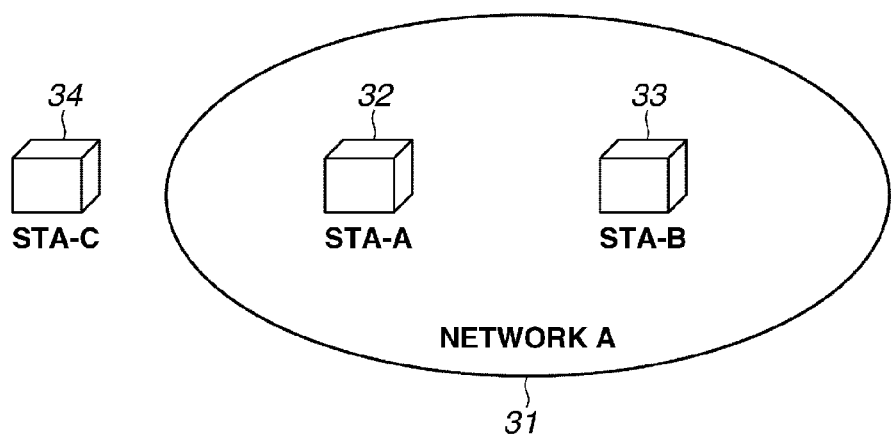
[Fig. 12B]
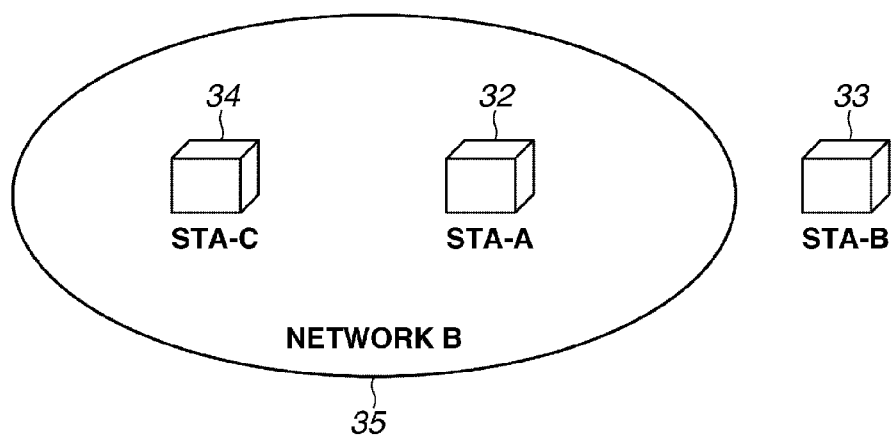

[Fig. 13]
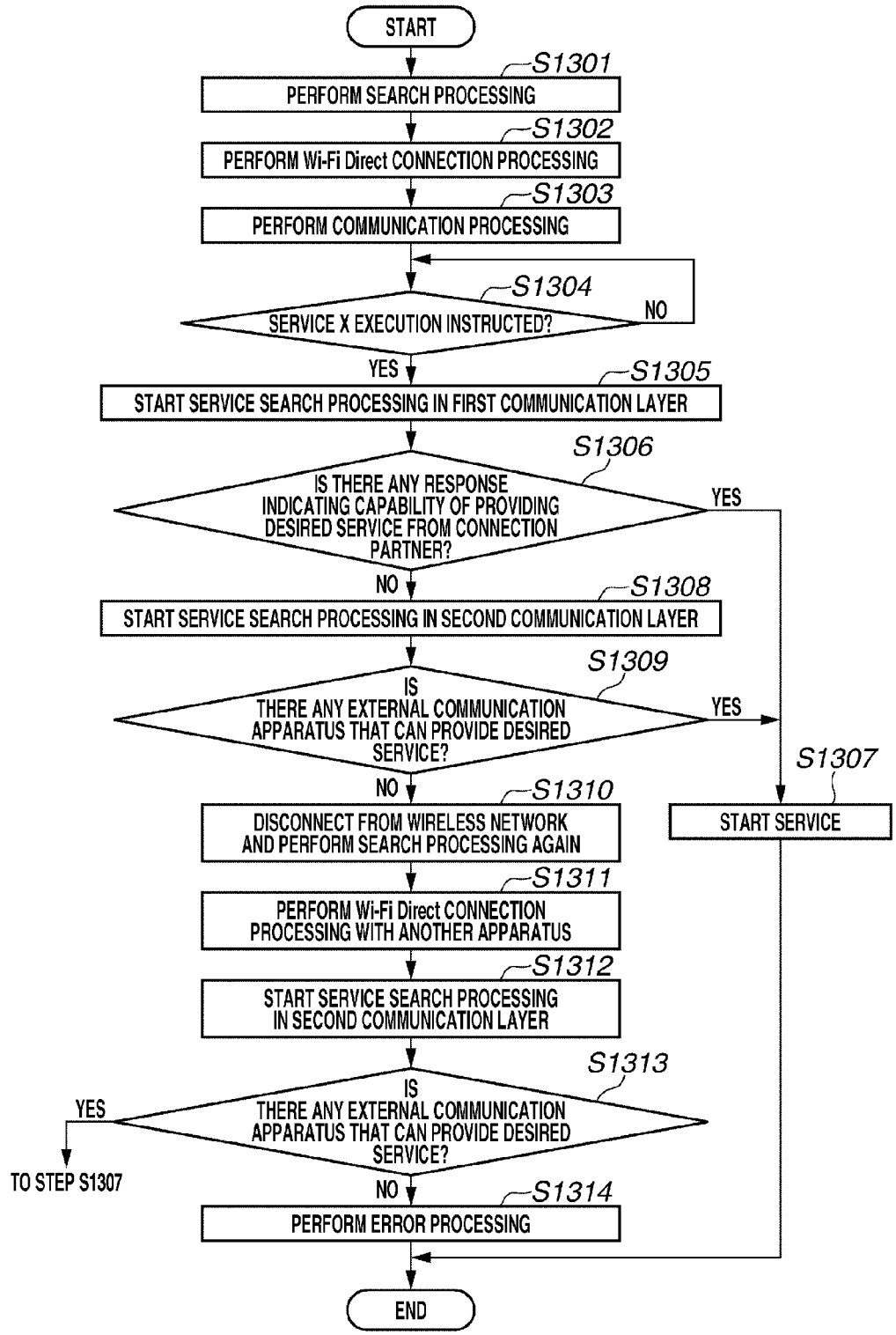

COMMUNICATION APPARATUS, METHOD FOR CONTROLLING COMMUNICATION APPARATUS, AND PROGRAM

TECHNICAL FIELD

The present invention relates to a communication apparatus, a method for controlling the communication apparatus, and a related program.

BACKGROUND ART

An electronic device (e.g., a digital camera or a printer) can use a wireless local area network (LAN) station function installed thereon as a recently developed function. The wireless LAN station function enables each electronic device to operate as a communication apparatus when it is connected to a wireless LAN. For example, as discussed in Japanese Patent Application Laid-Open No. 2011-35768, it is conventionally known that a digital camera can use a wireless LAN function installed thereon to share image data with other devices.

Further, Wi-Fi Alliance has certified Wi-Fi Direct. Wi-Fi Direct regulates protocols that are usable to determine whether an electronic device operates as a wireless LAN access point or as a wireless LAN station. An electronic device serving as a wireless LAN access point and another electronic device serving as a wireless LAN station can be automatically determined by executing the protocols. Therefore, Wi-Fi Direct can improve usability of user.

Wi-Fi Direct further regulates a service discovery function of advertising and searching for service information, which is supported by a higher-order application as an optional function. The service discovery function can improve usability of user because service information stored in another electronic device can be known before the electronic device becomes a connection partner through connection processing.

SUMMARY OF INVENTION

According to an aspect of the present invention, a communication apparatus includes a first detection means for detecting a service executable by another communication apparatus based on a communication in a first communication layer before a network is constructed with another communication apparatus. The communication apparatus further includes a second detection means for detecting a service executable by another communication apparatus based on a communication in a second communication layer that is different from the first communication layer after being wirelessly connected to the another communication apparatus, if a detection result obtained by the first detection means does not indicate that the another communication apparatus is capable of executing a predetermined service.

Further features and aspects of the present invention will become apparent from the following detailed description of exemplary embodiments with reference to the attached drawings.

BRIEF DESCRIPTION OF DRAWINGS

FIG. 1 is a block diagram illustrating a hardware configuration of a communication apparatus according to exemplary embodiments.

FIG. 2 is a block diagram illustrating a software configuration of the communication apparatus according to the exemplary embodiments.

FIG. 3 illustrates an example of a network configuration according to an exemplary embodiment.

FIG. 4 is a flowchart illustrating an operation that can be performed by the communication apparatus according to a first exemplary embodiment.

FIG. 5 is an operating sequence diagram according to the first exemplary embodiment.

FIG. 6 is an operating sequence diagram according to the first exemplary embodiment.

FIG. 7 is a flowchart illustrating an operation that can be performed by the communication apparatus according to a second exemplary embodiment.

FIG. 8 is an operating sequence diagram according to the second exemplary embodiment.

FIG. 9 is an operating sequence diagram according to the second exemplary embodiment.

FIG. 10 is an operating sequence diagram according to a third exemplary embodiment.

FIG. 11 is an operating sequence diagram according to the third exemplary embodiment.

FIG. 12A illustrates an example of a network configuration according to the third exemplary embodiment.

FIG. 12B illustrates an example of a network configuration according to the third exemplary embodiment.

FIG. 13 is a flowchart illustrating an operation that can be performed by the communication apparatus according to the third exemplary embodiment.

DESCRIPTION OF EMBODIMENTS

As mentioned above, Wi-Fi Direct can provide the service discovery function as an optional function. Therefore, it is impossible to receive a response to a service search request from a device that does not support the service discovery function. Therefore, using only the service discovery function is unfeasible to search for another apparatus that can execute a desired service but does not support the service discovery function.

Each of the following exemplary embodiments provides a communication apparatus that can appropriately detect a partner apparatus that can execute a desired service.

A communication apparatus according to a first exemplary embodiment is described in detail below with reference to attached drawings. A wireless LAN system according to the present exemplary embodiment conforms to IEEE802.11 standards. However, the communication configuration is not limited to the wireless LAN that conforms to IEEE802.11.

A hardware configuration according to the present exemplary embodiment is described. FIG. 1 is a block diagram illustrating a configuration example of a communication apparatus 101. A control unit 102 is configured to execute a control program stored in a storage unit 103 in such a way as to control various operations to be performed by the communication apparatus 101.

The storage unit 103 is configured to store the control program to be executed by the control unit 102 and various information pieces including communication parameters. Various operations described in detail below can be realized when the control unit 102 executes the control program stored in the storage unit 103.

A wireless communication unit 104 is configured to perform wireless LAN communications in conformity with IEEE802.11 standards. A display unit 105 is configured to perform various display operations. For example, the display unit 105 is a liquid crystal display (LCD) or a light-emitting diode (LED), which can output visually recognizable information, or a speaker that has a sound output function. The display unit 105 has a function of outputting at least one of visual information and sound information.

An antenna control unit 107 is configured to control an antenna 108. An operation unit 109 is configured to enable a user to perform various input operations to operate the communication apparatus 101. A service execution unit 110 is configured to execute service information comparable to applications that can be provided by the communication apparatus. For example, in a case where the communication apparatus is a printer that can execute a print service, the service execution unit 110 is a hardware device including a print engine that can execute the print service. Further, for example, in a case where the communication apparatus is a digital camera that can execute a captured image (moving image) distribution service, the service execution unit 110 is a hardware device including an image sensor and a lens, which can realize an image capturing function. The configuration illustrated in FIG. 1 is a mere example. The communication apparatus 101 can include a hardware configuration other than the hardware configuration illustrated in FIG. 1.

FIG. 2 is a block diagram illustrating a software function block 201 (i.e., an example software function block configuration) that can perform processing according to flowcharts and sequence diagrams described below and can execute a communication control function. A Discovery control unit 202 is configured to perform search processing for searching for a communication apparatus that serves as a communication partner.

A Wi-Fi Direct control unit 203 is configured to perform control in conformity with Wi-Fi Direct protocol specifications. According to Wi-Fi Direct, a communication apparatus that executes a wireless LAN access point function is referred to as a Peer-to-Peer (P2P) group owner (hereinafter, referred to as "GO"), and a communication apparatus that executes a wireless LAN station function is referred to as a P2P client (hereinafter, referred to as "CL"). The above-mentioned roles are determined by GO Negotiation protocols and regulated in Wi-Fi Direct specifications. According to Wi-Fi Direct, a network established by the GO is referred to as "P2P group." In the following description, the network may be referred to as "P2P group" and there is not any specific difference between them.

In the following description, each of the P2P group owner (GO), the P2P client (CL), and a communication apparatus group having an undetermined role may be commonly referred to as a "P2P device." Each P2P device has a CL function usable to participate in a wireless network and a GO function usable to construct a wireless network, which can be automatically determined by executing Wi-Fi Direct protocols. Then, the P2P device operates to realize a determined function and can establish a wireless connection to perform wireless communications. Further, if two apparatuses are connected using Wi-Fi Direct, the GO provides communication parameters to the CL so that the connection can be established using the communication parameters. The communication parameters include various wireless communication parameters to be used in performing wireless communications in conformity with IEEE802.11 standards. More specifically, the communication parameters include a network identifier, such as service set identifier (SSID), and information about an encryption method, an encryption key, an authentication method, and an authentication key, which are wireless communication parameters to be used in wireless LAN communications. Further, the communication parameters include an IP address required to perform communications in an internet protocol (IP) layer.

A Service Discovery control unit 204 is configured to control the service discovery function. The service discovery function enables a communication apparatus to transmit and receive service information to and from a partner communication apparatus by transmitting and receiving an action frame (Generic Advertisement Service (GAS) frame) defined in IEEE802.11u. More specifically, the Service Discovery control unit 204 transmits an "SD Query" frame (i.e., a GAS Initial Request), as a service search signal, to search for attribute information and corresponding service of another communication apparatus. Then, the Service Discovery control unit 204 receives a "SD Response" frame, as a response to the transmitted SD Query, from the partner apparatus. Alternatively, the Service Discovery control unit 204 receives a SD Query from a partner apparatus and transmits a SD Response as a response to the SD Query. The Service Discovery control unit 204 can detect the attribute information and the executable service of the other communication apparatus through the transmission and reception of the above-mentioned frames. Further, the Service Discovery control unit 204 can advertise a service that can be executed by its own apparatus to the other communication apparatus. Further, if there is not any response returned from the other communication apparatus in response to the transmitted SD Query, the Service Discovery control unit 204 can determine whether the other communication apparatus supports the service discovery function (i.e., an optional function of Wi-Fi Direct of the external communication apparatus). More specifically, the Service Discovery control unit 204 performs device service search processing to detect attribute information about another communication apparatus that is present in a wireless communicable range in a wireless communication layer. The Service Discovery control unit 204 performs the above-mentioned other apparatus attribute information detection processing in a first communication layer. In the present exemplary embodiment, an example of the first communication layer is a data link layer of the Open Systems Interconnection (OSI) reference model, but the first communication layer is not limited to the OSI reference model.

The SD Query based service search processing includes designating a desired service and acquiring a response from an apparatus that can execute the desired service and searching for all services that can be executed by another communication apparatus without designating any desired service.

In the present exemplary embodiment, it is presumed that the service information includes information about protocols to be used in mutually performing service communications and service function supportability information indicating supportability about essential functions and optional functions of the service. For example, the Service Discovery control unit 204 can determine whether another communication apparatus can execute a predetermined service (e.g., can support the print service) based on service information received from the other communication apparatus. Further, the Service Discovery control unit 204 can identify protocols to be used when another communication apparatus performs a predetermined service (e.g., a PictBridge based print service can be executed) based on service information received from the other communication apparatus. Further, in a case where another communication apparatus performs a predetermined service, the Service Discovery control unit 204 can identify service function supportability information (e.g., two-sided print supportability, color or monochrome print supportability, and format print supportability in the print service) based on service information received from the other communication apparatus. The above-mentioned examples are mere examples and not used to narrowly limit the present invention.

An L3 Service Discovery control unit 205 is configured to control the service discovery function in a network layer (i.e., layer 3) of the OSI reference model. Universal Plug and Play (UPnP) and Bonjour are techniques employable to realize the service discovery function. More specifically, the L3 Service Discovery control unit 205 can perform transmission and reception of service information in a second communication layer that is different from the first communication layer in which the Service Discovery control unit 204 transmits and receives service information to and from another communication apparatus. More specifically, even when a communication partner apparatus does not support the service discovery function (i.e., an optional function of Wi-Fi Direct), the L3 Service Discovery control unit 205 can transmit and receive service information to and from the communication partner apparatus if it supports UPnP or Bonjour. In the present exemplary embodiment, the second communication layer is the network layer. However, any other communication layer that is upper than the first communication layer is usable as the second communication layer.

The L3 Service Discovery control unit 205 can notify another communication apparatus of information about a service (e.g., a type of processing) that can be provided by its own apparatus, similar to the Service Discovery control unit 204 that performs advertisement and search of service information as mentioned above. Further, the L3 Service Discovery control unit 205 can acquire information about a service (e.g., a type of processing) that can be provided by another communication apparatus. The contents of service information to be transmitted and received by the Service Discovery control unit 204 can be identical to or different from the contents of service information to be transmitted and received by the L3 Service Discovery control unit 205.

The service search processing to be performed by the L3 Service Discovery control unit 205 may include designation of a desired service or may not include any desired service. In performing the service search processing, the L3 Service Discovery control unit 205 transmits a search signal in the second communication layer.

A packet receiving unit 206 and a packet transmitting unit 207 are configured to control reception and transmission of various packets including communication protocols of an upper layer. A service provision unit 208 is operable in an application layer. In the present exemplary embodiment, the application layer is a communication layer in which the service provision unit 208 can perform communication to provide a service in the fifth or more upper layer of the OSI reference model. More specifically, the service provision unit 208 is configured to control communications to provide services, including a print function, an image streaming function, and a file transfer function, to other communication apparatuses and can control the service execution unit 110.

A service usage unit 209 is operable in the application layer. The service usage unit 209 is configured to control communication relating to a service that a partner apparatus can provide via the communication in the application layer. More specifically, the service usage unit 209 can control a function of transmitting data for a printed product to a print service provision apparatus and a function of transmitting a moving image to a digital display device. Further, the service usage unit 209 can control the service execution unit 110. An error processing unit 210 is configured to perform error processing if execution of an intended service is unfeasible.

In the present exemplary embodiment, all functional blocks are related with each other in constituting a software or hardware configuration. Further, each of the above-mentioned functional blocks is a mere example. It is useful to integrate a plurality of functional blocks as a single functional block. Alternatively, it is useful to divide a functional block into a plurality of functional blocks. Further, the above-mentioned functional block can be realized by a hardware device.

Subsequently, an operation that can be performed by a communication apparatus that has the above-mentioned configuration is described in detail below. FIG. 3 illustrates a network A 31 (hereinafter, referred to as "network A") that includes a communication apparatus A 32 (hereinafter, referred to as "STA-A 32") and a communication apparatus B 33 (hereinafter, referred to as "STA-B 33"). These communication apparatuses have configurations illustrated in FIG. 1 and FIG. 2.

FIG. 4 is a flowchart illustrating an operation that can be performed by the communication apparatus that is operable as a service usage apparatus. An example operation of the communication apparatus, from searching of a service to using of the service, is described in detail with reference to the flowchart illustrated in FIG. 4.

First, in step S401, the Service Discovery control unit 204 starts service search processing (i.e., service discovery) in a wireless LAN layer. The Service Discovery control unit 204 transmits an SD Query and waits for reception of an SD Response. More specifically, the Service Discovery control unit 204 performs first detection processing for detecting a service that can be executed by another communication apparatus based on communications in the first communication layer. Next, in step S402, the Service Discovery control unit 204 determines whether another communication apparatus capable of providing the desired service has been detected in the service search processing. The above-mentioned determination can be performed by checking if a response indicating that the desired service can be executed has been received in response to the SD Query. If no SD Response is received in step S402, it is determined that the response indicating the capability of providing the desired service has not been received. Further, if information indicating the capability of providing the desired service cannot be detected from the SD Response, the Service Discovery control unit 204 determines that the response informing the capability of providing the desired service has not been received. If the other communication apparatus that has received the SD Query transmitted from the Service Discovery control unit 204 does not support the service discovery function (i.e., a predetermined function), the other communication apparatus does not respond to the SD Query.

If it is determined that the response informing the capability of providing the desired service has not been received (NO in step S402), then in step S405, the Wi-Fi Direct control unit 203 performs wireless connection processing. The wireless connection processing to be performed in step S405 includes forming a P2P group including another communication apparatus according to the Wi-Fi Direct specifications and establishing a network connection in both the wireless LAN layer and the IP layer. More specifically, according to the Wi-Fi Direct specifications, the Wi-Fi Direct control unit 203 performs scan processing, role (e.g., GO or CL) determination processing, and communication parameter sharing processing with respect to a partner apparatus.

In step S405, the Discovery control unit 202 can searches for a neighboring communication apparatus. Further, it is feasible to enable a user to select a connection partner from a list of search results to identify a service provision apparatus. Further, it is feasible to use any other method that can identify a connection partner. In step S406, the Wi-Fi Direct control unit 203 determines whether the wireless connection with the other communication apparatus has been successful in the wireless connection processing performed in step S405. For example, if there is not any other communication apparatus in the wireless communicable range, it means that the wireless connection processing has been failed. If it is determined that the wireless connection processing has been failed (NO in step S406), the operation proceeds to step S409.

If it is determined that the wireless connection processing has been successful (YES in step S406), then in step S407, the L3 Service Discovery control unit 205 starts service search processing. More specifically, the L3 Service Discovery control unit 205 performs second detection processing to detect a service that can be executed by the other communication apparatus based on communications in the second communication layer that is different from the first communication layer. In the following description, the L3 Service Discovery control unit 205 performs the service search processing in the second communication layer using Simple Service Discovery Protocol (SSDP), i.e., search communication protocols regulated by UPnP. The L3 Service Discovery control unit 205 transmits a service search signal, which is referred to as M-Search of SSDP, to confirm whether another communication apparatus connectable to the established network provides the desired service (e.g., the print service). In step S408, the L3 Service Discovery control unit 205 checks the presence of any other communication apparatus that can provide the desired service based on a result of the service search processing in the second communication layer. The L3 Service Discovery control unit 205 performs the above-mentioned determination processing by investigating the presence of a response to M-Search and determining whether a usable service type is included if the response is present. If it is determined that there is not any other communication apparatus that can provide the desired service (NO in step S408) or if it is determined that the wireless connection has been failed (NO in step S406), then in step S409, the error processing unit 210 performs error processing. The error processing to be performed in step S409 includes causing the display unit 105 to display a message indicating that there is not any apparatus that can provide the desired service and terminating the processing of the flowchart illustrated in FIG. 4.

Further, if it is determined that the other communication apparatus that can provide the desired service is present (YES in step S408), then in step S404, the service usage unit 209 starts the service based on the acquired service information.

On the other hand, if it is determined that the presence of another communication apparatus that can provide the desired service can be confirmed through the service search processing performed in the wireless LAN layer (YES in step S402), then in step S403, the Wi-Fi Direct control unit 203 performs wireless connection processing, similar to step S405. At the processing timing of step S403, it is feasible to omit the selection to be performed by a user because the service provision apparatus is already identified through the service search processing. For example, it is feasible to acquire a media access control (MAC) address (identification information) of the service provision apparatus through the service search processing. Therefore, by designating the acquired MAC address, it is feasible to autonomously limit the connection partner to the service provision apparatus detected in the search processing performed in step S402.

If the network connection is completed, then in step S404, the service usage unit 209 starts the service based on the service information obtained in the service search processing performed in step S401.

As mentioned above, even when no service search response can be received from another communication apparatus that does not support the service discovery function (i.e., an optional function), the communication apparatus according to the present exemplary embodiment performs wireless connection processing to communicate with another communication apparatus that supports Wi-Fi Direct and exists in the communicable range. Then, the communication apparatus performs service search processing regulated by UPnP and can confirm that there is another communication apparatus that can execute a desired service. Thus, executing the desired service becomes feasible. More specifically, the communication apparatus according to the present exemplary embodiment does not terminate the service execution processing even when there is not any response to the service discovery in the wireless LAN layer. The probability of detecting another apparatus that can execute the desired service can be improved.

The service usage apparatus and the service provision apparatus according to the present exemplary embodiment can be defined in the following manner. If the service to be executed is a print service, a beneficiary apparatus is an apparatus that stores an image or a document to be printed and a provision apparatus is an apparatus that includes a printing function. More specifically, the former is a digital camera or a smart phone and the latter is a printer. Further, if the service to be executed is a video streaming service, a beneficiary apparatus is a video recording apparatus (e.g., a digital camera or a camcorder) and a provision apparatus is an image display apparatus (e.g., a digital TV or a projector). Further, if the service to be executed is Digital Living Network Alliance (DLNA), an example service usage apparatus is a digital media server (DMS) and an example service provision apparatus is a digital media renderer (DMR). The above-mentioned devices are mere examples and other devices are applicable according to the definition of device classes in the DLNA standards.

Subsequently, an example operation that can be performed by two apparatuses according to the present exemplary embodiment is described in detail below with reference to sequence diagrams illustrated in FIGS. 5 and 6. In the example illustrated in FIG. 5, the STA-B 33 is operable as a provision apparatus that provides a service X and the STA-A 32 is operable as a beneficiary apparatus that uses the service X. Each of the STA-A 32 and the STA-B 33 supports the service discovery function.

In step F501 of FIG. 5, the STA-A 32 transmits an SD Query to detect another communication apparatus that can execute the service X using the service discovery function. According to the above-mentioned example, the SD Query to be transmitted by the STA-A 32 designates the service X. In this case, unicast, broadcast, or multicast is usable to transmit the SD Query. The STA-B 33 supports the service discovery function. Therefore, if the STA-B 33 receives the SD Query, then in step F502, the STA-B 33 transmits an SD Response indicating the capability of providing the service X to the STA-A 32. In this case, it is feasible to add service information indicating that the STA-B 33 supports a service other than the service X to the SD Response.

If the STA-A 32 receives a response to the transmitted SD Query from the STA-B 33, the STA-A 32 determines that the STA-B 33 can provide the service X. Then, in step F503, the STA-A 32 and the STA-B 33 perform wireless connection processing according to the Wi-Fi Direct specifications. Through the above-mentioned processing, the STA-A 32 and the STA-B 33 are brought into a state where wireless LAN connection is established between them and IP settings have been completed for them.

If the wireless connection between the STA-A 32 and the STA-B 33 is established, then in step F504, the STA-A 32 starts the service X based on the service information obtained by the service search processing. More specifically, in a case where the service X is the print service, the STA-A 32 performs print processing to print an image captured by the STA-A 32, which includes searching for a printer having the capability of print processing (i.e., the STA-B 33) and causing the STA-B 33 to print a captured image via the established wireless network.

Subsequently, according to the example illustrated in FIG. 6, the STA-B 33 is operable as a provision apparatus that provides the service X and the STA-A 32 is operable as a beneficiary apparatus that uses the service X. The STA-A 32 supports the service discovery function and the STA-B 33 does not support the service discovery function.

In step F601 of FIG. 6, the STA-A 32 transmits an SD Query, similar to step F501. In this case, the STA-B 33 does not return an SD Response to the SD Query because the STA-B 33 does not support the service discovery function.

The STA-A 32 does not receive any SD Response. Therefore, in step F602, the STA-A 32 determines that there is not any other communication apparatus that can provide the desired service and performs wireless connection processing in a state where no service information has been acquired. If the STA-A 32 detects the presence of STA-B 33 in the communicable range through scan processing, the STA-A 32 wirelessly connects with the STA-B 33.

If the wireless connection processing completes, then in step F603, the STA-A 32 starts service search processing in the second communication layer that is different from the first communication layer. According to the above-mentioned example, in step F603, the STA-A 32 transmits a service search request that designates the service X. The STA-B 33 supports the service search function in the second communication layer. Therefore, in step F604, the STA-B 33 transmits a service search response indicating the capability of providing the service X to the STA-A 32 in response to the service search request. If the STA-A 32 receives an L3 service search response, then in step F605, the STA-A 32 starts the service X based on attached service information.

As mentioned above, the communication apparatus according to the present exemplary embodiment can start the service regardless of whether another communication apparatus, which is capable of executing a desired service, supports the service discovery function. Further, if the service discovery function detects that the other communication apparatus can execute the desired service, the apparatus needs not to perform service search processing in another communication layer. Therefore, it is feasible to reduce the time required to start the service. Usability of user can be improved. Further, even when no service search response can be received from another communication apparatus that does not support the service discovery function (i.e., an optional function), the communication apparatus performs wireless connection processing. Then, by performing service search processing regulated in a communication layer different from a wireless LAN communication layer (e.g., UPnP), the communication apparatus can confirm that the other communication apparatus can execute the desired service. Thus, it becomes feasible to execute the desired service. More specifically, the communication apparatus according to the present exemplary embodiment does not terminate the service execution processing even when there is not any response to the service discovery. The probability of detecting another apparatus that can execute the desired service can be improved.

According to the above-mentioned example, the communication apparatus performs the service search processing using the SD Query and the SD Response. However, it is also useful to use other search signals (e.g., Probe Request and Probe Response) in the service search processing. For example, Information Element (IE) indicating the capability of executing a desired service can be added to the Probe Request and the Probe Response in performing service search processing.

Although in the above-mentioned example the service usage apparatus performs service search processing, it is useful that the service provision apparatus is configured to perform service search processing.

The communication apparatus having been described in the first exemplary embodiment performs the service discovery function based service search processing before being wirelessly connected to another communication apparatus. On the other hand, a communication apparatus according to a second exemplary embodiment is configured to perform the service discovery function based service search processing after being wirelessly connected to another communication apparatus. Then, if a connection partner does not support the service discovery function, the communication apparatus according to the second exemplary embodiment performs service search processing in a second communication layer. Each apparatus has a configuration similar to that described with reference to FIGS. 1 and 2 in the first exemplary embodiment.

An example operation that can be performed by a service usage apparatus according to the second exemplary embodiment is described in detail below with reference to a flowchart illustrated in FIG. 7. In the flowchart illustrated in FIG. 7, it is presumed that a service Y execution instruction is received in a state where a network is already constructed between the service usage apparatus and another communication apparatus to execute the service X.

The communication apparatus starts processing according to the flowchart illustrated in FIG. 7 if the service Y execution instruction is received in a state where the communication apparatus is currently executing (or has completed) another service after the wireless LAN connection has been established between the apparatus and the communication partner and IP settings have been completed for them. If the service Y execution instruction is received, then in step S701, the Service Discovery control unit 204 starts the service discovery function based service search processing. More specifically, the Service Discovery control unit 204 transmits an SD Query designating the service Y and waits for reception of an SD Response. The service search signals usable in step S701 are the combination of the SD Query and the SD Response or the combination of the Probe Request and the Probe Response.

Next, in step S702, the Service Discovery control unit 204 performs processing similar to that performed in step S402.

More specifically, the Service Discovery control unit 204 determines whether a connection partner can provide a desired service. If it is determined that a response informing the capability of providing the desired service has not been received (NO in step S702), then in step S704, the L3 Service Discovery control unit 205 starts service search processing in the second communication layer. Then in step S705, the L3 Service Discovery control unit 205 determines whether the connection partner can provide the desired service with reference to a result obtained in the service search processing performed in the second communication layer. If it is determined that the connection partner cannot provide the desired service (NO in step S705), then in step S706, the error processing unit 210 performs error processing. The error processing to be performed in step S706 includes causing the display unit 105 to display a message indicating that the connection partner cannot execute the desired service and terminating the processing of the flowchart illustrated in FIG. 7.

If it is determined that the connection partner can provide the desired service (YES in step S705), then in step S703, the service usage unit 209 performs processing similar to that performed in step S404. More specifically, the service usage unit 209 starts the service with the connection partner based on the acquired service information.

For example, it becomes feasible for the communication apparatus to start a file transfer service to transfer a file while executing a video streaming service to display a video. The description of the above-mentioned example intends to deepen understanding of the invention and does not intend to limit the invention.

Subsequently, an example operation that can be performed by two apparatuses according to the present exemplary embodiment is described in detail below with reference to sequence diagrams illustrated in FIGS. 8 and 9. In the example illustrated in FIG. 8, the STA-B 33 is operable as a provision apparatus that provides a service X and a service Y and the STA-A 32 is operable as a beneficiary apparatus that uses the service X and the service Y. Each of the STA-A 32 and the STA-B 33 supports the service discovery function. First, the STA-A 32 and the STA-B 33 start the service X and subsequently start the service Y, as described below.

Processing to be performed in steps F801 to F804 is similar to the processing performed in steps F501 to F504 and therefore redundant description thereof will be avoided. Through the above-mentioned processing, the STA-B 33 currently provides the service X to the STA-A 32. Next, if the execution of the service Y is instructed, then in step F805, the STA-A 32 transmits an SD Query designating the service Y (i.e., requesting the service Y). The STA-B 33 supports the service discovery function. Therefore, in step F806, the STA-B 33 transmits an SD Response indicating the capability of providing the service Y to the STA-A 32 in response to the received SD Query. If the STA-A 32 receives the SD Response, then in step F807, the STA-A 32 starts the service Y based on the acquired service information. Through the above-mentioned processing, it becomes feasible to start another service Y in the network constructed to execute the service X.

Subsequently, according to the example illustrated in FIG. 9, the STA-B 33 is operable as a provision apparatus that provides a service X and a service Y and the STA-A 32 is operable as a beneficiary apparatus that uses the service X and the service Y. The STA-A 32 supports the service discovery function and the STA-B 33 does not support the service discovery function. First, the STA-A 32 and the STA-B 33 start the service X and subsequently start the service Y, as described below.

Processing to be performed in steps F901 to F905 is similar to the processing performed in steps F601 to F605 and therefore redundant description thereof will be avoided. Through the above-mentioned processing, the wireless connection completes and the STA-B 33 currently provides the service X to the STA-A 32. Next, if the execution of the service Y is instructed, then in step F906, the STA-A 32 performs processing similar to that performed in step F805. More specifically, the STA-A 32 transmits an SD Query designating the service Y (i.e., requesting the service Y). However, the STA-B 33 does not support the service discovery function. Therefore, the STA-B 33 does not return an SD Response to the SD Query.

The STA-A 32 does not receive any SD Response. Therefore, in step F907, the STA-A 32 starts service search processing in the second communication layer that is different from the first communication layer. The STA-B 33 supports the service search function in the second communication layer. Therefore, in step F908, the STA-B 33 transmits a service search response informing the capability of providing the service Y to the STA-A 32 in response to the service search request. If the STA-A 32 receives an L3 service search response, then in step F909, the STA-A 32 starts the service Y based on attached service information.

In the above-mentioned example, the communication apparatus transmits the SD Query again for starting the service Y. However, it is useful to store failure information about the service X search processing in the storage unit 103 and omit the SD Query based search processing. In particular, if no response is received from the partner apparatus in the service discovery performed in the wireless LAN layer to search for the service X without designating any service, it is thought that the partner apparatus does not support the service discovery in the wireless LAN layer. Accordingly, in such a case, the communication apparatus can be configured to perform service search processing in the second communication layer without transmitting the SD Query again for starting the service Y.

As mentioned above, the communication apparatus according to the present exemplary embodiment can start the service regardless of whether the partner apparatus supports the service discovery function, even in a state where a network is already constructed.

A communication apparatus according to a third exemplary embodiment is configured to perform service discovery function based service search processing after being wirelessly connected with another communication apparatus as described in the second exemplary embodiment and, if a connection partner does not support the service discovery function, perform service search processing in the second communication layer, as described below. Each apparatus has a configuration similar to that described with reference to FIGS. 1 and 2 in the first exemplary embodiment. FIGS. 12A and 12B illustrate a system configuration according to the present exemplary embodiment. The system configuration illustrated in FIGS. 12A and 12B include a communication apparatus C 34 (hereinafter, referred to as "STA-C 34") in addition to the communication apparatus A 32 (i.e., "STA-A 32") and the communication apparatus B 33 (i.e., "STA-B 33").

FIG. 13 is a flowchart illustrating an operation that can be performed by the STA-A 32 according to the present exemplary embodiment. An example operation of the communication apparatus, from searching of a service to using of the service, is described in detail below with reference to the flowchart illustrated in FIG. 13.

First, in step S1301, the Discovery control unit 202 searches for a wireless communication apparatus in the communicable range. The search processing to be performed in step S1301 includes scanning all channels in conformity with Wi-Fi Direct protocol specifications and then searching for a partner apparatus by repeating scanning in a predetermined channel (i.e., a social channel) and waiting for a Probe Request to be received from another apparatus in the predetermined channel. In step S1302, the Wi-Fi Direct control unit 203 performs wireless connection processing with the partner apparatus identified in the search processing performed in step S1301. In step S1303, the STA-A 32 performs communication processing in the network constructed in step S1302.

The processing in step S1303 can be omitted if it is unnecessary. In step S1304, the STA-A 32 determines whether a service execution instruction has been received from a user after the network has been constructed. If it is determined that the service execution instruction has been received from the user (YES in step S1304), then in step S1305 the Service Discovery control unit 204 starts service search processing (i.e., service discovery) in the wireless LAN layer. More specifically, the Service Discovery control unit 204 transmits an SD Query by broadcast and waits for reception of an SD Response. Next, in step S1306, the Service Discovery control unit 204 determines whether a response informing the capability of providing the desired service has been received from the partner apparatus wirelessly connected in step S1302. Further, the Service Discovery control unit 204 stores identification information of a neighboring apparatus that can execute the desired service with reference to a response to the broadcasted SD Query.

If it is determined that the response informing the capability of providing the desired service has not been received from the connection partner (NO in step S1306), then in step S1308, the L3 Service Discovery control unit 205 starts service search processing. In the following description, the L3 Service Discovery control unit 205 is presumed to perform the service search processing in the second communication layer using search communication protocols SSDP regulated by UPnP. In step S1309, the L3 Service Discovery control unit 205 determines whether the connection partner can provide the desired service with reference to a result obtained in the service search processing performed in the second communication layer. The L3 Service Discovery control unit 205 performs the above-mentioned determination processing by investigating the presence of a response to M-Search and determining whether a usable service type is included if the response is present. If it is determined that the connection partner does not support the desired service (NO in step S1309), then in step S1310, the Discovery control unit 202 disconnects from the above-mentioned wirelessly connected connection partner (namely, separates from the network or withdraws from the group) and searches for a wireless communication apparatus again in the communicable range. If another communication apparatus that can execute the desired service is already detected through the service discovery broadcasted in step S1305, it is useful to transmit a Probe Request designating the detected other communication apparatus.

In step S1311, the Wi-Fi Direct control unit 203 performs wireless connection processing with another communication apparatus (i.e., an apparatus different from the partner connected in step S1302) that has been detected in the search processing performed in step S1310. In step S1312, the L3 Service Discovery control unit 205 starts service search processing for the partner newly connected in step S1311. In step S1313, the L3 Service Discovery control unit 205 determines whether there is another communication apparatus that can provide the desired service, which is connected in step S1312, with reference to a result obtained in the service search processing performed in the second communication layer in step S1311. If it is determined that the connection partner can provide the desired service (YES in step S1313), then in step S1307, the service usage unit 209 starts the service based on the acquired service information. If it is determined that the connection partner cannot provide the desired service (NO in step S1313), then in step S1314, the error processing unit 210 performs error processing. The error processing to be performed in step S1314 includes causing the display unit 105 to display a message indicating that there is not any apparatus that can provide the desired service and terminating the processing of the flowchart illustrated in FIG. 13. If it is determined that the connection partner can provide the desired service (YES in step S1306), then in step S1307, the service usage unit 209 starts the service.

Through the above-mentioned processing, it is feasible to determine whether the connection partner can execute a desired service in response to a service execution instruction after a wireless network has been constructed. Further, in a case where the connection partner cannot execute the desired service, it is feasible to execute the service by establishing a wireless connection with a neighboring other communication apparatus that can execute the desired service.

Subsequently, an example operation that can be performed by two apparatuses according to the third exemplary embodiment is described in detail below with reference to sequence diagrams illustrated in FIGS. 10 and 11. In the example illustrated in FIG. 10, the STA-B 33 is operable as a provision apparatus that provides a service X and the STA-A 32 is operable as a beneficiary apparatus that uses the service X. The STA-A 32 supports the service discovery function and the STA-B 33 does not support the service discovery function. Further, it is presumed that an execution instruction of the service X is received in a state where a network is already constructed by the STA-A 32 and the STA-B 33 through connection processing performed in conformity with Wi-Fi Direct protocol specifications.

In step F1001 of FIG. 10, the STA-A 32 constructs a network with the STA-B 33 by performing connection processing in conformity with Wi-Fi Direct protocol specifications. Then, in step F1002, the STA-A 32 performs ordinary communication processing to construct the network A 31 as illustrated in FIG. 12A. Next, in step F1003, a service X execution instruction is input. In step F1004, the STA-A 32 transmits an SD Query designating the service X (i.e., requesting the service X). The STA-B 33 does not support the service discovery function. Therefore, the STA-B 33 does not transmit an SD Response to the SD Query.

The STA-A 32 does not receive any SD Response. Therefore, subsequently in step F1005, the STA-A 32 starts service search processing in the second communication layer that is different from the first communication layer. The STA-B 33 supports the service search function in the second communication layer. Therefore, in step F1006, the STA-B 33 transmits a service search response informing the capability of providing the service X to the STA-A 32 if it receives a service search request. If the STA-A 32 receives an L3 service search response, then in step F1007, the STA-A 32 starts the service X based on attached service information.

In the above-mentioned example, the communication apparatus transmits the SD Query again at the start timing of the service X. However, it is useful to store failure information about the service X search processing in the storage unit 103 and omit the SD Query based search processing.

Subsequently, according to the example illustrated in FIG. 11, the STA-C 34 is operable as a provision apparatus that provides the service X and the STA-A 32 is operable as a beneficiary apparatus that uses the service X. The STA-A 32 supports the service discovery function. Further, the STA-B 33 does not support the service discovery function and the service X. Further, it is presumed that an execution instruction of the service X is received in a state where a network is already constructed by the STA-A 32 and the STA-B 33 through connection processing performed in conformity with Wi-Fi Direct protocol specifications.

In step F1101 of FIG. 11, the STA-A 32 constructs a network with the STA-B 33 by performing connection processing in conformity with Wi-Fi Direct protocol specifications. Then in step F1102, the STA-A 32 performs ordinary communication processing to construct the network A 31 as illustrated in FIG. 12A. Next, in step F1103, a service X execution instruction is input to the STA-A 32. In step F1104, the STA-A 32 transmits an SD Query designating the service X (i.e., requesting the service X) by broadcast. The STA-B 33 does not support the service discovery function. Therefore, the STA-B 33 does not transmit an SD Response to the SD Query. Similarly, the STA-C 34 does not support the service discovery function. Therefore, the STA-C 34 does not return an SD Response to the SD Query.

The STA-A 32 does not receive any SD Response. Therefore, subsequently in step F1105, the STA-A 32 starts service search processing in the second communication layer that is different from the first communication layer. The network constructed between the STA-A 32 and the STA-B 33 is currently maintained. Therefore, the effectiveness of the service search function in the second communication layer is limited to the currently connected communication partner apparatus. However, the STA-B 33 presently belonging to the same group does not support the service X. Therefore, the STA-B 33 does not return any response when it receives a service search request. The STA-A 32 determines that there is not any apparatus that can execute the desired service in the presently connected network. Thus, in step F1106, the STA-A 32 performs processing for disconnecting from the presently connected network. Subsequently, in step F1107, the STA-A 32 performs wireless connection processing including partner scan processing according to the Wi-Fi Direct specifications to establish a connection with another communication apparatus (namely, the STA-C 34), which is in a communicable state. According to the example illustrated in FIG. 12B, the STA-C 34 is the other communication apparatus that can be identified through the above-mentioned scan processing. The STA-A 32 newly constructs a network B 35 with the STA-C 34 as illustrated in FIG. 12B. As described above, the STA-C 34 does not return any response to the signal transmitted in step F1104 (i.e., the signal to be used in the service discovery performed in the wireless LAN layer). Therefore, the STA-A 32 determines that the STA-C 34 does not support the service discovery function. After the STA-A 32 determines that the STA-C 34 does not support the service discovery function, in step F1108, the STA-A 32 starts service search processing in the second communication layer that is different from the first communication layer.

The STA-C 34 supports the service search function in the second communication layer. Therefore, in step F1109, the STA-C 34 transmits a service search response informing the capability of providing the service X to the STA-A 32 when it receives a service search request. If the STA-A 32 receives an L3 service search response, then in step F1110, the STA-A 32 starts the service X based on attached service information.

According to the above-mentioned example, no SD Query is transmitted before the wireless connection in step F1107. However, the SD Query based search processing can be performed again before the wireless connection in step F1107.

As mentioned above, the communication apparatus according to the present exemplary embodiment can search for a communication partner that can execute a desired service in a state where a network is already constructed, even when a connection partner does not support the desired service. Further, the communication apparatus according to the present exemplary embodiment can search for a communication partner that can execute a desired service regardless of a situation that a connection partner may not support a desired service discovery function.

In the above-mentioned exemplary embodiment, the communication apparatus sequentially performs a plurality of types of processing (i.e., service search processing, wireless connection processing, and L3 service search processing). However, it is feasible to perform two or more types of processing in parallel. For example, if a service provision apparatus cannot be found in service search processing performed at the beginning for a predetermined time, the communication apparatus can execute the service search processing in parallel with the wireless connection processing or the L3 service search processing. If a desired service search response can be received in the service search processing performed in parallel, the communication apparatus can start the service while omitting or interrupting the L3 service search processing.

Further, in a case where a higher-order application requires service information (e.g., IP address) to be acquired in the L3 service search processing, the communication apparatus can start the wireless connection processing and the L3 service search processing while skipping the service search processing. Further, the communication apparatus can perform similar processing in a case where it is feasible to recognize beforehand that a connection partner does not support the service search function based on a user instruction.

Further, in a case where a higher-order application requires service information to be acquired in the service search processing, the communication apparatus can display an error message if a desired service search response cannot be received in the service search processing.

The present invention can be realized by supplying a recording medium recording software program codes capable of realizing the above-mentioned functions to a system or an apparatus and causing a computer (e.g., central processing unit (CPU) or a micro-processing unit (MPU)) of the system or the apparatus to read the program codes from the recording medium and execute processing according to the read program. In this case, the program codes can realize the functions of the above-mentioned exemplary embodiments when they are read out of a storage medium. In this respect, the present invention encompasses the storage medium storing the program codes.

For example, a flexible disk, a hard disk drive, an optical disk, a magneto-optical disk, a compact disc read only memory (CD-ROM), a compact disc recordable (CD-R), a magnetic tape, a nonvolatile memory card, a read only memory (ROM), or a digital versatile disk (DVD) is usable as the storage medium that can supply program codes.

Further, realization of the above-mentioned functions is not limited to the situation that the computer executes the readout program codes. An operating system (OS) running on the computer can perform a part or the whole of actual processing based on instructions of the program codes in such a way as to realize the above-mentioned functions.

Further, the program codes read out of a storage medium can be written into a memory of a function expansion board inserted in a computer or into a memory of a function expansion unit connected to the computer. In this case, a CPU provided on the function expansion board or the function expansion unit can perform a part or the whole of actual processing based on instructions of the program coded in such a way as to realize the above-mentioned functions.

As mentioned above, a communication apparatus according to the present invention can appropriately detect another apparatus that can execute a desired service.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-030900 filed Feb. 20, 2013 and No. 2013-030901 filed Feb. 20, 2013, which are hereby incorporated by reference herein in their entirety.

The invention claimed is:

1. A communication apparatus, comprising:
    a memory and one or more processors;
    a first construction unit configured to construct a first wireless network with a first external communication apparatus;
    a first detection unit configured to detect any external apparatuses capable of executing a predetermined service based on a discovery protocol in a first communication layer after the communication apparatus has constructed the first wireless network with the first external communication apparatus;
    a storing unit configured to store information on a second external communication apparatus detected by the first detection unit, the information indicating that the second external communication apparatus is capable of executing the predetermined service;
    a second detection unit configured to detect whether the first external communication apparatus can execute the predetermined service based on a communication via the first wireless network in a second communication layer that is different from the first communication layer, if the discovery protocol in the first communication layer fails or is not supported by the first external communication apparatus, or in a case where the first detection unit does not detect that the first external apparatus is capable of executing the predetermined service;
    a second construction unit configured to, in a case where the second detection unit has not detected that the first external communication apparatus is capable of executing the predetermined service, terminate the first wireless network constructed with the first external communication apparatus and construct a second wireless network with the a second external communication apparatus by using the information stored in the storing unit; and
    an execution unit configured to, in a case where the first detection unit detects the first external communication apparatus, execute the predetermined service with the first external communication apparatus, without detection by the second detection unit, in a case where the second detection unit detects that the first external communication apparatus is capable of executing the predetermined service, execute the predetermined service with the first external communication apparatus, and in a case where the second detection unit detects that the first external communication apparatus is not capable of executing the predetermined service, execute the predetermined service with the second external communication apparatus,
    wherein the one or more processors implement the first construction unit, the first detection unit, the storing unit, the second detection unit, the second construction unit, and the execution unit.

2. The communication apparatus according to claim 1, wherein the second detection unit detects the predetermined service executable by the first external communication apparatus based on the communication in the second communication layer, if any response to a service search signal transmitted based on the discovery protocol in the first communication layer is not received from the first external communication apparatus.

3. The communication apparatus according to claim 1, wherein the first detection unit detects the predetermined service executable by the first external communication apparatus based on information included in a response to a service search signal transmitted based on the discovery protocol in the first communication layer.

4. The communication apparatus according to claim 1, wherein the second detection unit detects the predetermined service executable by the first external communication apparatus based on information included in a response to a service search signal transmitted based on the discovery protocol in the second communication layer.

5. The communication apparatus according to claim 1, wherein the communication apparatus executes the predetermined service with the first external communication apparatus if a detection result obtained by any one of the first detection unit and the second detection unit indicates that the first external communication apparatus is capable of executing the predetermined service.

6. The communication apparatus according to claim 1, wherein the first detection unit detects any external apparatuses capable of executing the predetermined service based on a communication in a data link layer of an Open Systems Interconnection (OSI) reference model serving as the first communication layer.

7. The communication apparatus according to claim 1, wherein the first detection unit detects any external apparatuses capable of executing the predetermined service, using a Generic Advertisement Service frame defined in IEEE802.11u, a Probe Request or a Probe Response.

8. The communication apparatus according to claim 1, wherein the first detection unit detects any external apparatuses capable of executing the predetermined service based on Wi-Fi Direct (registered trademark).

9. The communication apparatus according to claim 1, wherein the second detection unit detects the predetermined service executable by the first external communication apparatus based on a communication in a network layer of the OSI reference model serving as the second communication layer.

10. The communication apparatus according to claim 1, wherein the second detection unit detects the predetermined service executable by the first external communication apparatus based on Universal Plug and Play or Bonjour (registered trademark).

11. The communication apparatus according to claim 1, wherein the first construction unit constructs the first wireless network with the first external communication apparatus based on Wi-Fi Direct.

12. The communication apparatus according to claim 1, wherein the predetermined service is a print service, a data distribution service, or a moving image streaming service.

13. A method for controlling a communication apparatus, the method comprising:
performing, using one or more processors, a first construction for constructing a first wireless network with a first external communication apparatus;
performing, using one or more processors, a first detection for detecting any external apparatuses capable of executing a predetermined service based on a discovery protocol in a first communication layer after the communication apparatus has constructed the first wireless network with the first external communication apparatus;
storing, using memory and one or more processors, information on a second external communication apparatus detected by the first detection, the information indicating that the second external communication apparatus is capable of executing the predetermined service;
performing, using one or more processors, a second detection for detecting whether the first external communication apparatus can execute the predetermined service based on a communication via the first wireless network in a second communication layer that is different from the first communication layer, if the discovery protocol in the first communication layer fails or is not supported by the first external communication apparatus, or in a case where the first detection does not detect that the first external apparatus is capable of executing the predetermined service,
in a case where the second detection has not detected that the first external communication apparatus is capable of executing the predetermined service, terminating the first wireless network constructed with the first external communication apparatus and constructing a second wireless network with the second external communication apparatus by using the information stored; and
using one or more processors,
in a case where the first detection detects the first external communication apparatus, executing the predetermined service with the first external communication apparatus, without performing the second detection,
in a case where the second detection detects that the first external communication apparatus is capable of executing the predetermined service, executing the predetermined service with the first external communication, and
in a case where the second detection detects that the first external communication apparatus is not capable of executing the predetermined service, executing the predetermined service with the second external communication apparatus.

14. A non-transitory computer readable storage medium storing a program that causes a computer to implement a method for controlling a communication apparatus, the method comprising:
performing, using one or more processors, a first construction for constructing a first wireless network with a first external communication apparatus;
performing, using one or more processors, a first detection for detecting any external apparatuses capable of executing a predetermined service based on a discovery protocol in a first communication layer after the communication apparatus has constructed the first wireless network with the first external communication apparatus;
storing, using memory and one or more processors, information on a second external communication apparatus detected by the first detection, the information indicating that the second external communication apparatus is capable of executing the predetermined service;
performing, using one or more processors, a second detection for detecting whether the first external communication apparatus can execute the predetermined service based on a communication via the first wireless network in a second communication layer that is different from the first communication layer, if the discovery protocol in the first communication layer fails or is not supported by the first external communication apparatus, or in a case where the first detection does not detect that the first external apparatus is capable of executing the predetermined service,
in a case where the second detection has not detected that the first external communication apparatus is capable of executing the predetermined service, terminating the first wireless network constructed with the first external communication apparatus and constructing a second wireless network with the second external communication apparatus by using the information stored; and
using one or more processors,
in a case where the first detection detects the first external communication apparatus, executing the predetermined service with the first external communication apparatus, without performing the second detection, in a case where the second detection detects that the first external communication apparatus is capable of executing the predetermined service, executing the predetermined service with the first external communication, and in a case where the second detection detects that the first external communication apparatus is not capable of executing the predetermined service, executing the predetermined service with the second external communication apparatus.

* * * * *